United States Patent
Hirano

(10) Patent No.: US 12,026,414 B2
(45) Date of Patent: Jul. 2, 2024

(54) PRINTING SYSTEM, PRINTING DEVICE, AND CONTROL METHOD FOR PRINTING SYSTEM

(71) Applicant: CANON KABUSHIKI KAISHA, Tokyo (JP)

(72) Inventor: Tsubasa Hirano, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/983,672

(22) Filed: Nov. 9, 2022

(65) Prior Publication Data
US 2023/0185503 A1    Jun. 15, 2023

(30) Foreign Application Priority Data
Dec. 9, 2021 (JP) .................... 2021-200439

(51) Int. Cl.
*G06F 3/12* (2006.01)

(52) U.S. Cl.
CPC .......... *G06F 3/1267* (2013.01); *G06F 3/1203* (2013.01); *G06F 3/1232* (2013.01); *G06F 3/1253* (2013.01); *G06F 3/1287* (2013.01)

(58) Field of Classification Search
CPC .... G06F 3/1267; G06F 3/1203; G06F 3/1232; G06F 3/1253; G06F 3/1287; G06F 3/1204; G06F 3/1205; G06F 3/122; G06F 3/1285
See application file for complete search history.

(56) References Cited

U.S. PATENT DOCUMENTS

| | | | |
|---|---|---|---|
| 7,307,742 B2 | 12/2007 | Noda | |
| 2002/0035585 A1* | 3/2002 | Noda | G06F 3/1204 715/274 |
| 2004/0246513 A1* | 12/2004 | McKinley | G06F 3/1207 358/1.14 |
| 2007/0133044 A1* | 6/2007 | Tanaka | H04N 1/32128 358/1.15 |
| 2011/0228310 A1* | 9/2011 | Yanagi | G06F 3/1232 358/1.14 |
| 2014/0211248 A1* | 7/2014 | Uchikawa | H04L 67/51 358/1.15 |
| 2019/0303054 A1* | 10/2019 | Kaneda | G06F 3/1285 |

FOREIGN PATENT DOCUMENTS

JP    2002-169674 A    6/2002

OTHER PUBLICATIONS

Michael Sweet, The Printer Working Group, IPP Storage Extensions v1.0, Lakeside Robotics Corporation, Jan. 29, 2021.

* cited by examiner

*Primary Examiner* — Huo Long Chen
(74) *Attorney, Agent, or Firm* — VENABLE LLP

(57) ABSTRACT

A printing system includes a printing device that returns, using IPP, a response to an inquiry of its printing capability to an information processing device, inclusive of information indicating a storage region, with the information indicating the storage region being specified in attribute information defined by the IPP or attribute information defined independently by a vendor by extending the IPP, and stores the printing job in a designated storage region in a case where the storage request for the printing job including information for designating the storage region of the printing job has been received from the information processing device.

12 Claims, 13 Drawing Sheets

FIG. 6

```
Capability inquiry request packet

Version : 2.0
Operation : Get-Printer-Attributes
Request-ID : 1

Operation-attributes-tag :
・Requested-attributes:
 operations-supported
 color-supported
 copies-supported
 sides-supported
 job-storage-supported
 job-storage-access-supported
 job-storage-group-supported
```

FIG. 7A

Capability response packet (case of number management)

Version : 2.0
Status-code : successful
Request-ID : 1

Operation-attributes-tag:
• Printer-attributes-tag
operations-supported : "create-job", "send-document", "cancel-job", "Get-Printer-attributes", "Get-Job-attributes", "Hold-job"
color-supported : true
copies-supported : 1 – 9999
sides-supported : "one-sided", "two-sided-short-edge"
job-storage-supported : job-storage-access-supported", "job-storage-group-supported"
job-storage-access-supported : "group"
job-storage-group-supported : "No.1", "No.2", "No.3", "No.4", "No.5"

FIG. 7B

Capability response packet (case of name management)

Version : 2.0
Status-code : successful
Request-ID : 1

Operation-attributes-tag:
• Printer-attributes-tag
operations-supported : "create-job", "send-document", "cancel-job", "Get-Printer-attributes", "Get-Job-attributes", "Hold-job"
color-supported : true
copies-supported : 1 – 9999
sides-supported : "one-sided", "two-sided-short-edge"
job-storage-supported : job-storage-access-supported", "job-storage-group-supported"
job-storage-access-supported : "group"
job-storage-group-supported : "Sales", "Development", "Management", "Personnel", "Public relations"

FIG. 7C

Capability response packet
(case of only storage job support, single storage region)

Version : 2.0
Status-code : successful
Request-ID : 1

Operation-attributes-tag:
• Printer-attributes-tag
operations-supported : "create-job", "send-document", "cancel-job", "Get-Printer-attributes", "Get-Job-attributes", "Hold-Job"
color-supported : true
copies-supported : 1 – 9999
sides-supported : "one-sided", "two-sided-short-edge"

FIG. 7D

Capability response packet (case of storage non-support)

Version : 2.0
Status-code : successful
Request-ID : 1

Operation-attributes-tag:
• Printer-attributes-tag
operations-supported : "create-job", "send-document", "cancel-job", "Get-Printer-attributes", "Get-Job-attributes"
color-supported : true
copies-supported : 1 – 9999
sides-supported : "one-sided", "two-sided-short-edge"

FIG. 9A

```
Printing request packet (case of number management)

Version : 2.0
Operation : Hold-Job
Request-ID : 2

Operation-attributes-tag :
 requesting-user-name : alice
 job-name : test.pdf

Job-attributes-tag:
 print-color-mode : monocrome
 copies : 1
 sides : two-sided-short-edge
 job-storage-group : "No.3"
```

FIG. 9B

```
Printing request packet (case of name management)

Version : 2.0
Operation : Hold-Job
Request-ID : 2

Operation-attributes-tag :
 requesting-user-name : alice
 job-name : test.pdf

Job-attributes-tag:
 print-color-mode : monocrome
 copies : 1
 sides : two-sided-short-edge
 job-storage-group : "Management"
```

FIG. 9C

```
Processing response packet

Version : 2.0
Status-code : successful
Request-ID : 2

Job-attributes-tag:
job-id : 1
job-uri : ipp://canon.local/job-1
job-state : saved
job-state-reasons : job-saved-successfully
job-uuid : urn:uuid: xxx
```

FIG. 12A

Capability response packet (case of number management)

Version : 2.0
Status-code : successful
Request-ID : 1

Operation-attributes-tag:
·Printer-attributes-tag
operations-supported : "create-job" , "send-document" , "cancel-job" , "Get-Printer-attributes" , "Get-Job-attributes" , "Hold-job"
color-supported : true
copies-supported : 1 - 9999
sides-supported : "one-sided" , "two-sided-short-edge"
cn-job-storage-destination-supported : "No.1" , "No.2" , "No.3" , "No.4" , "No.5"

FIG. 12B

Printing request packet (case of number management)

Version : 2.0
Operation : Hold-Job
Request-ID : 2

Operation-attributes-tag :
requesting-user-name : alice
job-name : test.pdf

Job-attributes-tag:
print-color-mode : monochrome
copies : 1
sides : two-sided-short-edge
cn-job-storage-destination : "No.3"

PRINTING SYSTEM, PRINTING DEVICE, AND CONTROL METHOD FOR PRINTING SYSTEM

BACKGROUND OF THE INVENTION

Field of the Invention

A printing system of the present invention is a printing system comprising: an information processing device; and a printing device including one or more storage regions for storing printing jobs received from the information processing device, the information processing device and the printing device communicating with each other using an Internet printing protocol (IPP), wherein the information processing device includes a memory storing instructions, and a processor executing the instructions causing the information processing device to: inquire the printing device about printing capability; display a candidate for a storage destination of a printing job corresponding to information indicating a storage region acquired from the printing device on a printing setting screen in a case where the information indicating the storage region of the printing job is included in a response to the inquiry of the printing capability received from the printing device; and designate a storage region corresponding to a storage destination of a printing job selected by a user on the printing setting screen and transmit a storage request for the printing job to the printing device, wherein the printing device includes a memory storing instructions, and a processor executing the instructions causing the printing device to: return a response to the inquiry of the printing capability, which is received from the information processing device, to the information processing device, inclusive of the information indicating the storage region; and store the printing job in a designated storage region in a case where the storage request for the printing job including information for designating the storage region of the printing job has been received from the information processing device.

Description of the Related Art

In a case where a request received from the client terminal 102 is a printing job storage request, the job storage unit 3020 of the printing device 101 stores a printing job received from the client terminal 102 in a storage region in S508. In a case where a printing job storage destination is designated in the storage request, the job storage unit 3020 stores a printing job in the designated storage region. In addition, when the storage of the printing job in the designated storage region is completed, the printing device 101 transmits a result of the processing to the client terminal 102 in step S509. FIG. 9C illustrates an example of a processing response packet returned as a response in a case where job storage is successful, with "successful" indicating that a status code has been successful is stored. Further, in a case where designated processing could not be executed, an error indicating a failure is returned as a response.

In S1106, the job management unit 302 responds to the client terminal 102 with the result of the processing executed in response to the printing request received from the client terminal 102. For example, in a case where the printing processing has been performed in S1104, the completion of the printing processing is so notified. In a case where a job has been successfully stored in S1104 and S1105, a response indicating that the job has been successfully stored is transmitted to the client terminal 102. FIG. 9D illustrates an example of a processing response packet returned as a response in a case where the job has been successfully stored. "Successful" indicating a success is stored in a status code. Further, in a case where the designated processing could not be executed, an error indicating a failure is returned as a response.

In the first embodiment, information on a printing job storage region has been transmitted and received using the attribute information of "Job-Storage" specified by the IPP.

In a second embodiment, a mechanism for designating a printing job storage region by using an IPP vendor extension will be described. A vendor extension is not specified in the IPP standard, but is means providing a mechanism for defining attributes in the same manner as that of the IPP standard and analyzing the attributes on a transmission side and a reception side in advance, and expressing any attribute value. In the present embodiment, a storage region that can be designated as a printing job storage destination in a capability response is so notified by using a vendor extension (vendor proprietary attributes). Note that a hardware configuration and a processing flow of each device in the second embodiment are the same as those in the first embodiment. Hereinafter, differences from the first embodiment will be described.

SUMMARY OF THE INVENTION

FIG. 12A illustrates an example of a capability response packet in which a printing device 101 responds to a capability request received from a client terminal 102 in the second embodiment. A storage region is notified of by using a vendor extension without using a "Job-Storage" attribute specified by the IPP. Here, the storage region is stored in attribute information indicating a storage region for storing a printing job defined independently by a vendor called "cn-job-storage-destination-supported". Information indicating a storage region for a printing job managed by the printing device 101 is stored in the value of attribute information indicating the storage region. The example of FIG. 12A corresponds to FIG. 4A, and numbers of "No. 1" to "No. 5" indicating storage regions 1 to 5 are stored. In a case where storage regions are managed by names as illustrated in FIG. 4C, the name of a storage region is stored in "cn-job-storage-destination".

The PSA of the client terminal 102 that has received the response analyzes the vendor extension included in the capability response packet received by the client terminal 102 and displays a detailed setting screen illustrated in FIG. 11. Capability information based on the capability response packet is notified to the PSA via the OS. FIGS. 13A to 13C are diagrams illustrating examples of printing setting screens displayed by the PSA in the second embodiment. The printing setting screens are displayed when an operation key (not illustrated) for performing detailed printing settings is pressed after the printing device 101 is selected as a printer to be used for output. When the OS detects that the operation key for performing detailed printing has been pressed, it is determined whether or not the PSA associated with the printer used for output has been installed. In a case where the PSA associated with the printer used for output has been installed, the PSA associated with the printer used for output is started up.

This application claims the benefit of Japanese Patent Application No. 2021-200439, filed Dec. 9, 2021, which is hereby incorporated by reference herein in its entirety.

BRIEF DESCRIPTION OF THE DRAWINGS

FIG. 6 is a diagram illustrating an example of a capability inquiry request packet in a first embodiment.

FIGS. 7A to 7D are diagrams illustrating examples of a capability response packet in the first embodiment.

FIGS. 9A to 9C are diagrams illustrating examples of packets of a printing request and a processing response in the first embodiment.

FIGS. 12A and 12B are diagrams illustrating examples of packets of a capability response and a printing request in a second embodiment.

DESCRIPTION OF THE EMBODIMENTS

First Embodiment

Figure 1:
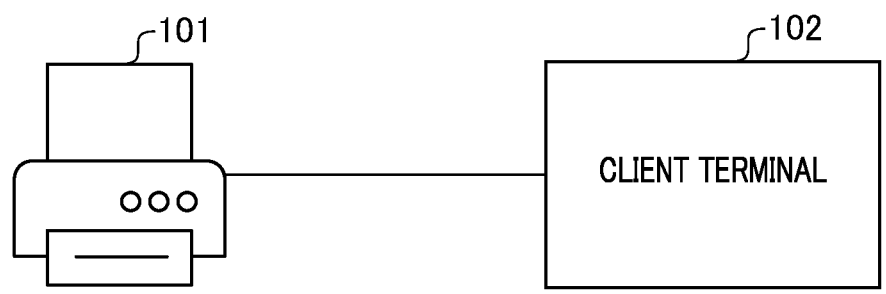
FIG. 1 is a diagram illustrating an example of a printing system.

FIG. 1 is a diagram illustrating an example of a printing system according to the present embodiment. The printing system includes a printing device 101 and a client terminal 102. The printing device 101 communicates with the client terminal 102 via a network. The network may be configured as, for example, a communication network such as a LAN or a WAN, communication using a USB, a cellular network (such as LTE or 5G), a wireless network based on IEEE 802.11, or a combination thereof. That is, as the network, any communication method may be adopted as long as data can be transmitted and received via the network.

The printing device 101 is an output device having a printing function. The printing function is a function of printing an image on a sheet such as paper based on a printing job received from an external device. In addition, the printing function of the printing device 101 also includes a reservation printing function. In the case of reservation printing, printing processing is executed by temporarily reserving a printing job received from the client terminal 102 in a storage and causing a user to give an instruction for executing the reserved printing job by operating the printing device 101. For this reason, the printing device 101 of the present embodiment has one or more storage regions for storing printing jobs received from an external device. The printing job which is temporarily reserved is stored in a storage region provided in a storage such as an HDD provided in the printing device 101.

The printing device 101 may be, for example, a multi-function peripheral (MFP) having a plurality of functions such as a printing function, a copying function, and a scanning function. The scanning function is a function of transmitting data based on an image to the outside, the image being obtained by being read using a scanner. In addition, the printing device 101 may be a single function peripheral (SFP) with a single function which has only a printing function. Further, in the present embodiment, although printing on a sheet such as paper is described as an example, the present invention is not limited thereto, and can also be applied to printing control in 3D printing for molding three-dimensional objects based on three-dimensional shape data.

The client terminal 102 is an information processing device having a function of transmitting a printing job including printing data to the printing device 101. The client terminal 102 is, for example, a smartphone, a tablet, a PC, or the like. In order to perform printing, for example, a user installs a vendor driver and a client application of the printing device 101 on the client terminal 102 and uses it. In addition, the Internet printing protocol (IPP) installed on the client terminal 102 in advance may be used. In recent years, a client terminal 102 on which a printing function using a standard printing framework such as the IPP, such as Air-Print or Mopria, is installed in advance has become widespread. A standard printing program such as the IPP is installed on the client terminal 102.

<Hardware Configuration>

Figure 2A:
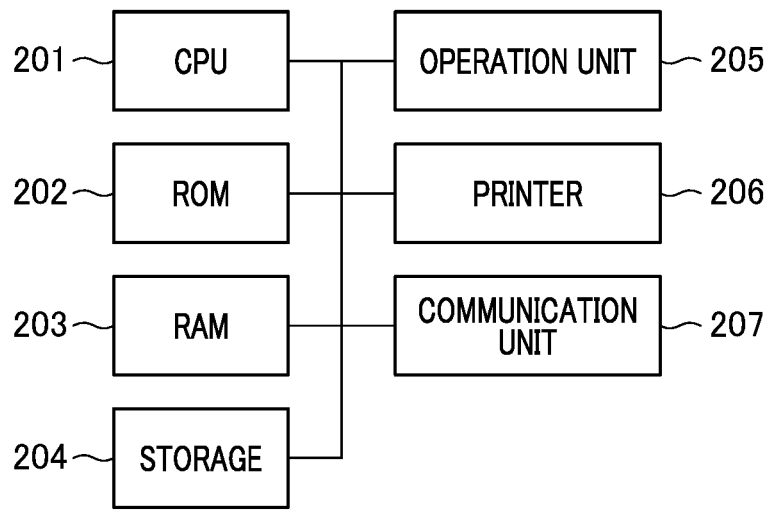
FIGS. 2A and 2B are diagrams illustrating examples of hardware configurations of a printing device and a client terminal.

FIG. 2A is a diagram illustrating a hardware configuration of the printing device 101. The printing device 101 includes a CPU 201, a ROM 202, a RAM 203, a storage 204, an operation unit 205, a printer 206, and a communication unit 207.

The central processing unit (CPU) 201 controls the overall operation of the printing device 101. The CPU 201 reads a control program stored in the read only memory (ROM) 202 or the storage 204 and performs a variety of controls such as printing control and reading control. The ROM 202 stores control programs that can be executed by the CPU 201, and the like. The random access memory (RAM) 203, which is a main storage memory accessed by the CPU 201, is used as a work area or a temporary storage region for loading various control programs. The storage 204 stores printing jobs, image data, various programs, and various setting information. In this manner, hardware such as the CPU 201, the ROM 202, the RAM 203, and the storage 204 constitutes a so-called computer.

Note that, in the printing device 101 of the present embodiment, one CPU 201 executes processes shown in a flowchart to be described below using one memory, but other modes may be adopted. For example, the processes shown in the flowchart to be described below can also be executed by a plurality of processors, a plurality of memories, and a storage cooperating with each other. In addition, some of the processes may be executed using a hardware circuit.

The operation unit 205 is equipped with a display unit having a touch panel function and various hard keys. The operation unit 205 functions as a display unit for displaying information to a user and functions as a reception unit for receiving the user's instruction. The CPU 201 cooperates with the operation unit 205 to control the display of information and the reception of user operations.

The printer 206 is an output device that forms an image based on a printing job received from an external device such as the client terminal 102 and outputs the image on a sheet. In addition, the printer 206 optically reads a document image which is set on a scanner based on a printing control command input via the operation unit 205, and outputs the image on paper. A method of printing the image on the sheet may be an electrophotographic method in which a toner is transferred onto paper and fixed, or an inkjet method in which ink is ejected onto paper for printing, or other modes may be adopted.

The communication unit 207 communicates with an external device on a network or the Internet. In the present embodiment, a case where the communication unit 207 is a communication interface for performing wired communication conforming to Ethernet is assumed, but the present invention is not limited thereto. For example, the communication unit 207 may be a wireless communication interface based on the IEEE 802.11 series, or may be a communication interface for performing mobile communication such as 3G lines such as CDMA, 4G lines such as LTE, and 5G NR.

Figure 2B:
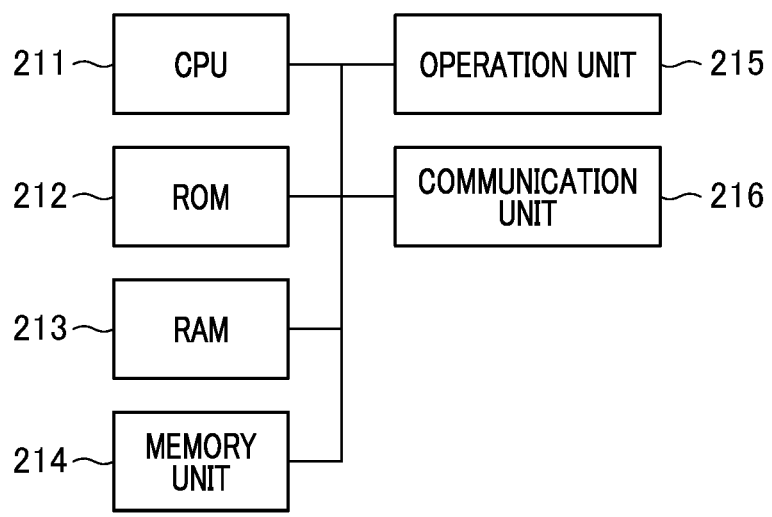

FIG. 2B is a diagram illustrating a hardware configuration of the client terminal 102. The client terminal 102 includes a CPU 211, a ROM 212, a RAM 213, a memory unit 214, an operation unit 215, and a communication unit 216.

The central processing unit (CPU) 211 controls the overall operation of the client terminal 102. The CPU 211 reads a control program stored in the read only memory (ROM) 212 or the memory unit 214 and performs a variety of controls. The ROM 212 stores control programs that can be executed by the CPU 211. The random access memory (RAM) 213, which is a main storage memory accessed by the CPU 211, is used as a work area or a temporary storage region for loading various control programs. The memory unit 214 stores various programs and various setting information.

Note that, in the client terminal 102 of the present embodiment, one CPU 211 executes processes shown in a flowchart to be described below using one memory, but other modes may be adopted. For example, the processes shown in the flowchart to be described below can also be executed by a plurality of processors, a plurality of memories, and a storage cooperating with each other. In addition, some of the processes may be executed using a hardware circuit.

The operation unit 215 is provided with, for example, a display unit and an input/output unit such as a mouse and a keyboard. The operation unit 205 functions as a display unit for displaying information to a user and functions as a reception unit for receiving the user's instruction. The CPU 211 cooperates with the operation unit 215 to control the display of information and the reception of user operations.

The communication unit 216 executes communication with an external device on a network or the Internet. In the present embodiment, a case where the communication unit 216 is a communication interface for performing wired communication conforming to Ethernet is assumed, but the present invention is not limited thereto. For example, the communication unit 216 is a wireless communication interface conforming to the IEEE 802.11 series. In addition, the communication unit 216 may be a communication interface for performing mobile communication such as 3G lines such as CDMA, 4G lines such as LTE, and 5G NR.

<Software Configuration>

Figure 3A:
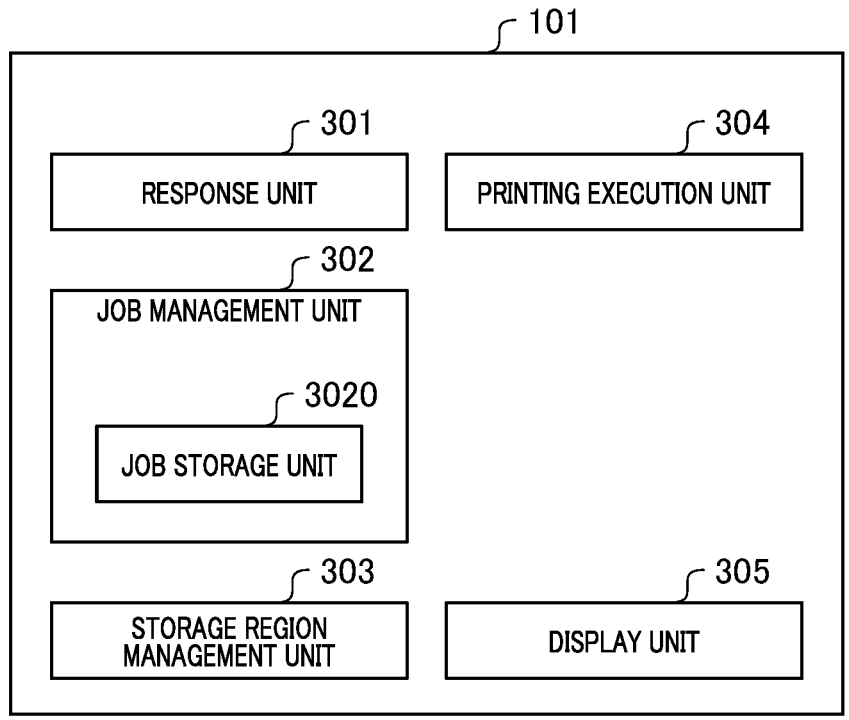
FIGS. 3A and 3B are diagrams illustrating examples of software configurations of the printing device and the client terminal.

FIG. 3A is a diagram illustrating a software configuration of the printing device 101. The printing device 101 includes a response unit 301, a job management unit 302, a storage region management unit 303, a printing execution unit 304, and a display unit 305. The response unit 301 responds to inquiries about printing capabilities from the client terminal 102. The job management unit 302 manages jobs acquired from an external device such as the client terminal 102 and causes each module to execute processing according to the job. The job management unit 302 includes a job storage unit 3020 that executes job storage processing. The job storage unit 3020 performs processing for storing a job in a case where a request for storing a job such as a printing job is received. The storage region management unit 303 manages a job storage region. In the present embodiment, the storage region management unit 303 manages a storage region and also manages the name of the storage region. The printing execution unit 304 performs printing processing based on a printing job. The display unit 305 controls the display on the operation unit 205 and also receives a user's operation using a touch panel and hardware keys. The display unit 305 can configure a GUI as if the user can directly operate a screen displayed on the touch panel by associating display coordinates and input coordinates on the touch panel.

Figure 3B:
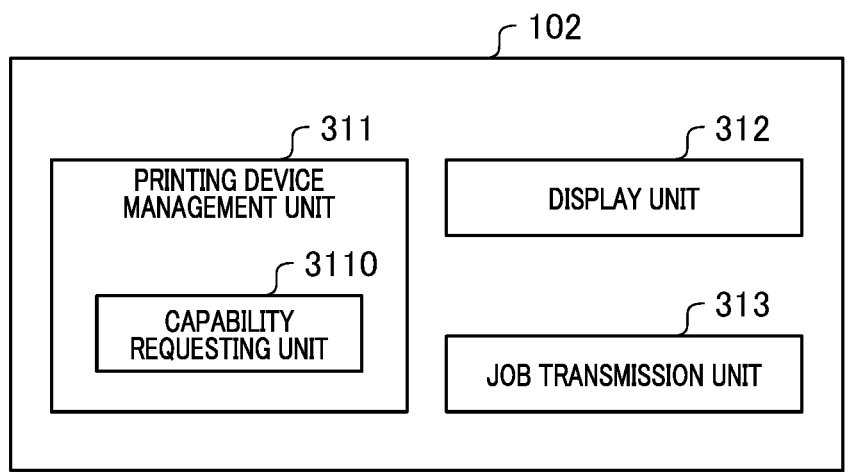

FIG. 3B is a diagram illustrating a software configuration of the client terminal 102. The client terminal 102 includes a printing device management unit 311, a display unit 312, and a job transmission unit 313. The printing device management unit 311 manages information of the printing device that transmits a printing instruction from the client terminal 102. In addition, the printing device management unit 311 includes a capability requesting unit 3110. The capability requesting unit 3110 transmits a capability request for inquiring a printing capability from the printing device at the time of adding a printer for performing printing and acquires a response to the inquiry from the printing device. The display unit 312 controls the display on the operation unit 215 and receives the user's operation. The job transmission unit 313 generates a job such as a printing job for instructing the printing device 101 to perform processing and transmits the generated job to the printing device 101.

Figure 4A:
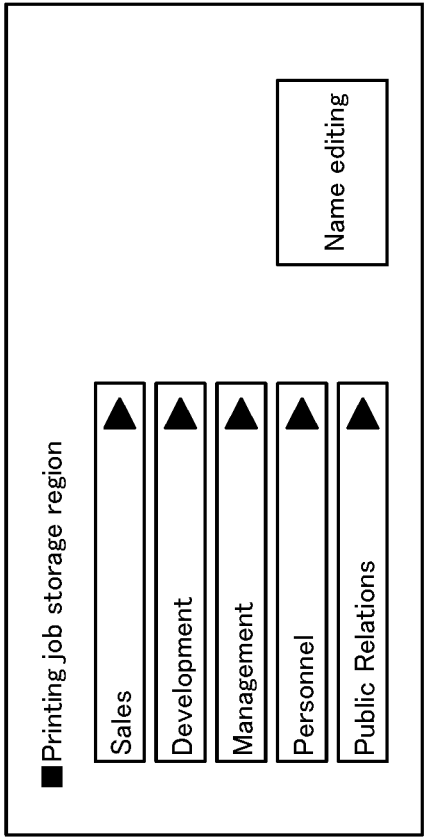
FIGS. 4A to 4D are diagrams illustrating examples of job storage regions of the printing device.
Figure 4C:
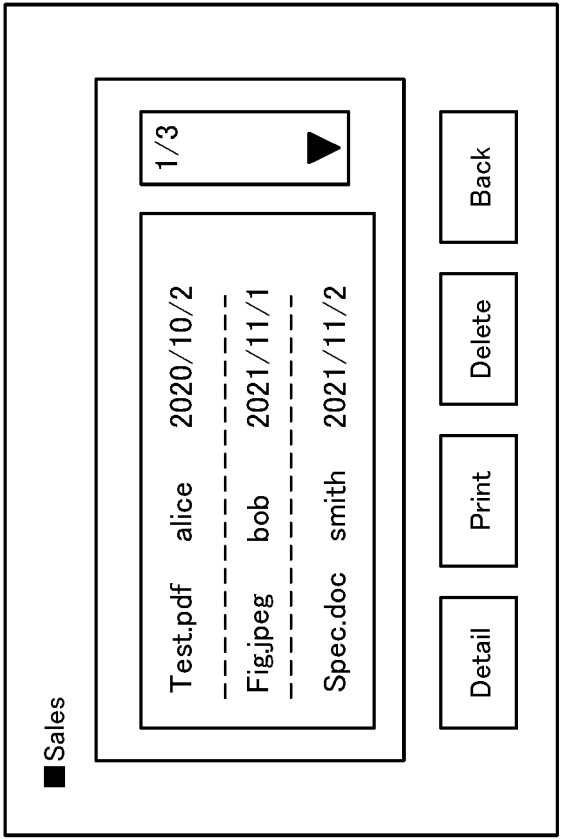
Figure 4B:
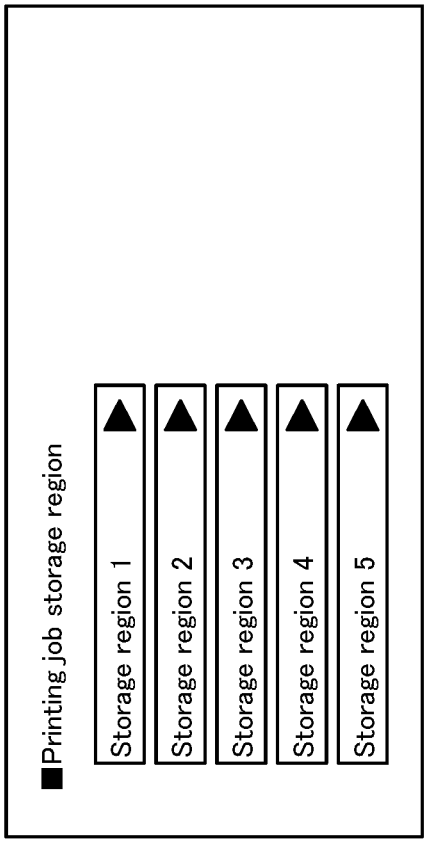
Figure 4D:
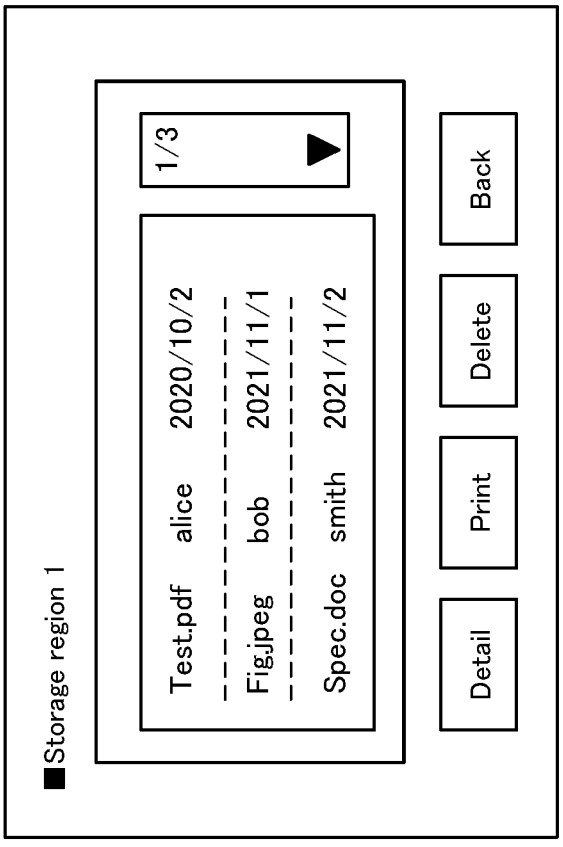

In reservation printing, a reservation printing job received by the communication unit 207 from the client terminal 102 is temporarily reserved in a storage region of the storage 204, and printing processing according to the reserved printing job is executed by the printer 206 in response to the user's instruction through the operation unit 205. Here, the storage region for storing the printing job received by the printing device 101 will be described. The printing device 101 may divide the storage region for storing the printing job into a plurality of regions and manage the regions. FIGS. 4A to 4D are diagrams illustrating examples of job storage regions of the printing device. FIG. 4A illustrates an example in which the storage regions are identified by numbers. In FIG. 4A, storage regions 1 to 5 are provided as the storage regions. A printing job is stored in each of the storage regions. FIG. 4B illustrates an example of the storage region 1. When the user operates the printing device 101 and selects the storage region 1, a list of a file name, a user name, a date and time of reception, and the like of printing data of a printing job stored in the storage region 1 is displayed. The user can execute printing according to the printing job by selecting a desired printing job from the list and pressing a printing button. FIG. 4C illustrates an example in which the storage regions are identified by names. A storage region is provided for each department, such as "sales," "development," "management," "personnel," and "public relations." FIG. 4D illustrates an example of the storage region named sales. The storage region for sales stores printing jobs received from users associated with a sales department.

A plurality of storage regions are set and operated according to an environment in which they are used, such as for each department, each user, or each application. In a case where a vendor driver is used in the client terminal 102, the user can designate any storage region to execute a printing job. This is because the printing device 101 notifies the vendor driver of information of the storage region by using a protocol which is common to vendors, and the notified vendor driver can display the information of the storage region on a printing setting screen displayed on the client terminal 102.

On the other hand, as specified in RFC8011 in the Internet printing protocol (IPP), an instruction for storing a printing job can be given using an operation called HoleJob, but the designation of a storage region is not specified. Thus, in a case where the IPP is used as specified in the client terminal 102, the user cannot store a printing job by designating any storage region. For this reason, in a case where the IPP is used, in which storage region of the printing device 101 a printing job is stored depends on the printing device 101. Consequently, in the present embodiment, even when the IPP is used, the storage region of the printing device 101 is designated so that an instruction for storing a printing job can be transmitted from the client terminal 102 to a negative pressure device.

Figure 5:
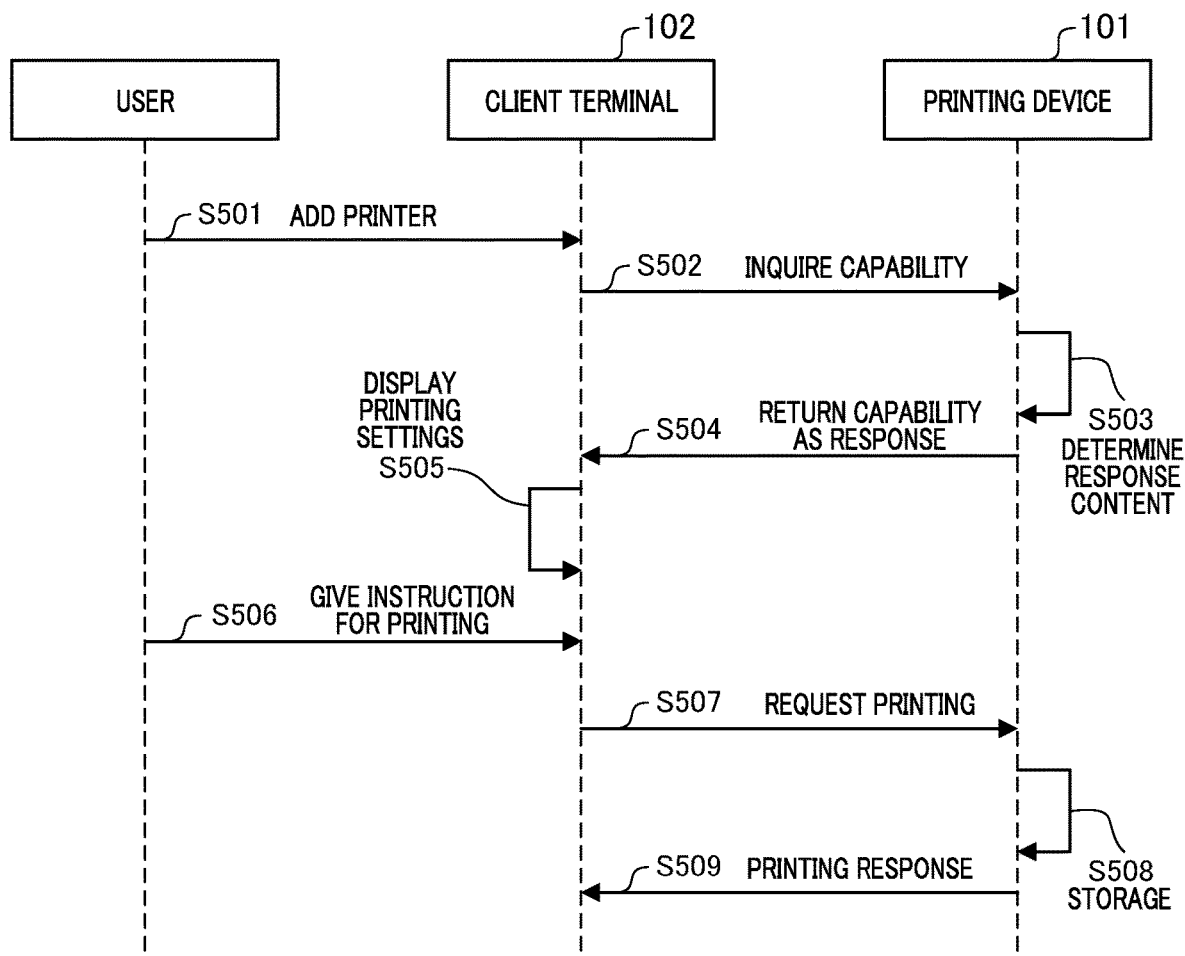
FIG. 5 is a sequence diagram of printing job storage processing.

A series of processes for storing a printing job in a designated storage region will be described with reference to FIG. 5. FIG. 5 is a diagram illustrating a sequence of transmission and reception of a printing job. The processes executed by the printing device 101 in FIG. 5 are realized by causing the CPU 201 to read a program stored in the ROM 202 to the RAM 203 and execute the program. The processes executed by the client terminal 102 are realized by causing the CPU 211 to read a program stored in the ROM 212 or the memory unit 214 to the RAM 203 and execute the program.

In S501, the printing device management unit 311 of the client terminal 102 receives an instruction for adding the printing device 101 to a printer which is to perform printing from a user. In a printer addition method, for example, printing devices on a network are searched for, and the printer is selected from among the searched printing devices and added. Specifically, first, the client terminal 102 having received an instruction for printer searching from the user searches for the printing devices on the network on a printer setting screen and displays a list of the printing devices searched for. Then, the user selects a desired printing device from the list of the printing devices, and thus the client terminal 102 receives an instruction for adding the printing device selected by the user. Note that a printer addition method varies depending on an OS, and thus a printing device may be added by other addition methods.

In S502, the capability requesting unit 3110 of the client terminal 102 transmits a printing capability inquiry to the printing device 101 designated to be added in S501 and requests a printing capability. In the present embodiment, an inquiry related to the management of a job storage region is included in a capability inquiry content. The content of the transmitted inquiry will be described with reference to FIG. 6. FIG. 6 illustrates an example of a packet for requesting a capability inquiry. In the present embodiment, a capability inquiry is requested using a Get-Printer-Attributes operation of the IPP. In the capability inquiry request packet, "Operations-supported" indicates an inquiry regarding what kind of printing function the printing device 101 has. In addition, "job-storage-supported", "job-storage-access-supported", and "job-storage-group-supported" are inquired as attribute information of "Job-Storage". "job-storage-supported" is an inquiry regarding what kind of function of job storage is supported. "job-storage-access-supported" is an inquiry regarding what kind of access right management is performed. "job-storage-group-supported" is an inquiry regarding what kind of group management is performed.

In S503, the response unit 301 of the printing device 101 which has received the capability inquiry request creates a response to the capability inquiry request. Details of processing for determining a response content and creating the response in accordance with the capability inquiry request will be described later. In S504, the response unit 301 of the printing device 101 transmits the response to the capability inquiry created in S503 to the client terminal 102 which is an inquiry source. The content of the transmitted response will be described with reference to FIGS. 7A to 7D.

FIGS. 7A to 7D are examples of capability response packets. FIGS. 7A and 7B illustrate examples of responses in a case where the printing device 101 has a printing job storage function and has a plurality of storage regions for storing printing jobs. FIG. 7C illustrates an example of a response in a case where the printing device 101 has a printing job storage function, but has only one storage region for storing printing jobs. FIG. 7D illustrates an example of a response in a case where the printing device 101 does not have a printing job storage function. In a case where the printing device 101 has a printing job storage function, "Operations-supported" including "Hold-Job" is returned as a response (FIGS. 7A to 7C). On the other hand, in a case where the printing device 101 does not have a printing job storage function, "Operations-supported" that does not include "Hold-Job" is returned as a response (FIG. 7(D)).

In a case where the printing device 101 has a printing job storage function and has a plurality of storage regions, the response unit 301 also responds to attribute information of "Job-Storage". In "job-storage-supported", a supported job storage function is returned as a response, and for example, two of "job-storage-access-supported" and "job-storage-group-supported" are included. In "job-storage-access-supported", a response is returned for the management of an access right of a stored job, and for example, any one of "group", "public", "owner", and the like is specified. In the examples of FIG. 7A and FIG. 7B, "job-storage-access-supported" including "group" indicating that an access right is managed for each group is returned as a response. Attribute information of "job-storage-group-supported" represents a user's group in the definition of the IPP, but in the present embodiment, a value indicating a storage region managed as a job storage destination is returned as a response. That is, the printing device 101 notifies the client terminal 102 of an attribute of "job-storage-group-supported" including information indicating a storage region that can be designated as a printing job storage destination by a user. FIG. 7A corresponds to the job storage regions illustrated in FIG. 4A, and stores the numbers of the storage regions as information indicating the storage regions in "job-storage-group-supported". FIG. 7B corresponds to the job storage regions illustrated in FIG. 4C, and stores the names of the storage regions as information indicating the storage regions in "job-storage-group-supported". In this manner, in the present embodiment, the client terminal 102 is notified of a response to a printing capability request using the IPP, the response including information of storage regions of the printing device 101.

Figure 8B:
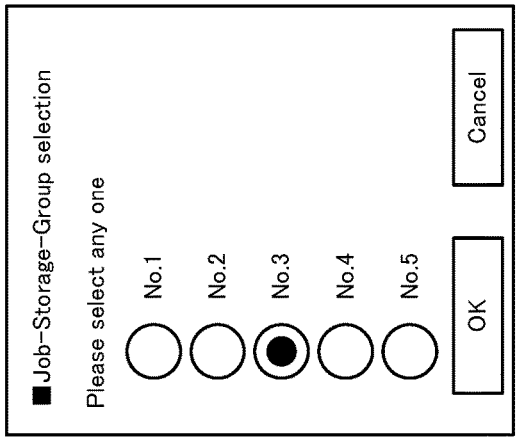
FIGS. 8A to 8C are diagrams illustrating examples of a printing setting screen in the first embodiment.
Figure 8C:
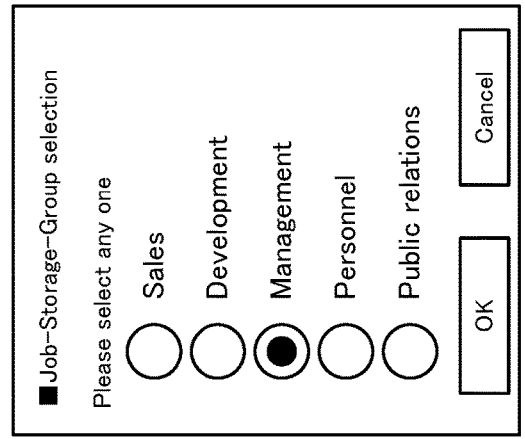
Figure 8A:
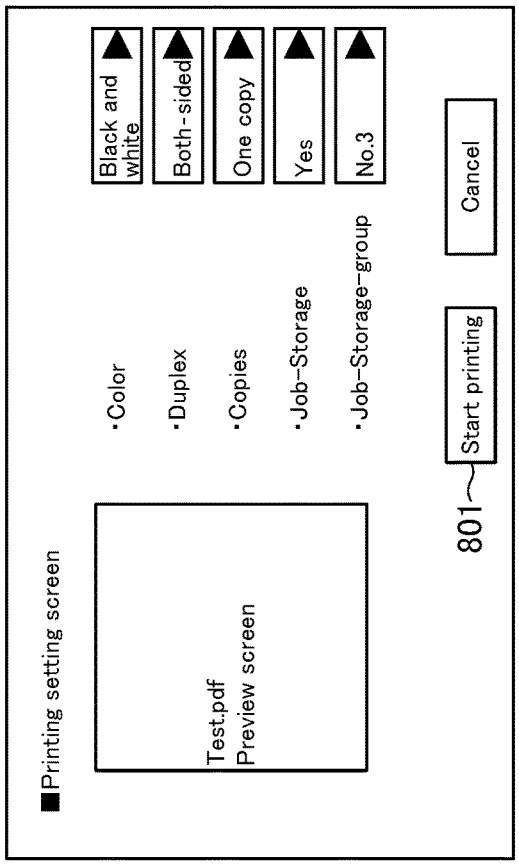

In S505, the display unit 312 of the client terminal 102 displays a printing setting screen corresponding to the capability response received from the printing device 101. FIGS. 8A to 8C are diagrams illustrating examples of printing setting screens. FIG. 8A illustrates an example of a printing setting screen. For example, in a case where a response indicating that two options of "black and white" and "color" are possible is returned as a response in the capability response, "color setting" can be selected from two of "black and white" and "color." Further, in a case where Hold-Job operation is possible and included in the capability response, "Job-Storage setting" (job storage setting) can be selected from two of "yes" and "no". Further, in a case where information of a job storage region is stored in "job-storage-group-supported" in the capability response, the number and name of the job storage region are displayed in "Job-storage-group setting" on a printing setting screen so as to be selectable. FIG. 8B illustrates an example of selection of "Job-storage-group setting" in a case where the number of a job storage region is included in "job-storage-group-supported" in a capability response. FIG. 8B corresponds to the examples of FIG. 7A and FIG. 4A. FIG. 8C illustrates an example of selection of "Job-storage-group setting" in a case where the name of a job storage region is included in "job-storage-group-supported" in a capability response. FIG. 8C corresponds to the examples of FIG. 7B and FIG. 4C. As illustrated in FIGS. 8B and 8C, the display unit 312 displays, on the printing setting screen, a candidate for a printing job storage destination corresponding to information indicating a storage region included in "job-storage-group-supported" of a response acquired from the printing device 101. A user selects "Yes" of "Job-Storage" on the printing setting screen, selects and designates a desired storage destination in "Job-storage-group", and performs an operation of selecting a printing start button 801 to instruct the printing device 101 to store a printing job.

When the printing start button 801 is selected by the user, the job transmission unit 313 of the client terminal 102 receives a printing instruction from the user in S506. Further, in S507, the job transmission unit 313 of the client terminal 102 transmits a printing request including a printing job to the printing device 101 using the IPP in accordance with printing settings designated by the user. In a case where setting for job storage is designated on the printing setting screen, the job transmission unit 313 transmits a printing job storage request to the printing device 101 as a printing request. At this time, in a case where a printing job storage destination is designated by the user, information indicating a storage region serving as a storage destination is included in a storage request.

FIGS. 9A and 9B illustrate examples of packets of printing requests transmitted to the printing device 101 by the client terminal 102 in S506. FIG. 9A illustrates an example of a packet in a case where job storage is performed, and a storage region is designated as No. 3 on the printing setting screen as illustrated in FIGS. 8A and 8B. "Hold-Job" for giving an instruction for job storage is stored in "Operation" indicating processing requested from the printing device 101, and the value of "No. 3" is stored in "job-storage-group" indicating a job storage destination. FIG. 9B illustrates an example of a packet in a case where "job storage" is designated as "Yes", and "storage region" is designated as "management" as illustrated in FIG. 8C. "Hold-Job" for giving an instruction for job storage is stored in "Operation" indicating processing requested from the printing device 101, and the value of "management" is stored in "job-storage-group" indicating a job storage destination. In this manner, the job transmission unit 313 stores a storage region corresponding to a storage destination of a printing job selected by the user on the printing setting screen in attribute information of "job-storage-group", and transmits a printing job storage request to the printing device 101.

In a case where a request received from the client terminal 102 is a printing job storage request, the job storage unit 3020 of the printing device 101 stores a printing job received from the client terminal 102 in a storage region in S508. In a case where a printing job storage destination is designated in the storage request, the job storage unit 3020 stores a printing job in the designated storage region. In addition, when the storage of the printing job in the designated storage region is completed, the printing device 101 transmits a result of the processing to the client terminal 102 in step S509. FIG. 9C illustrates an example of a processing response packet returned as a response in a case where job storage is successful. "successful" indicating that a status code has been successful is stored. Further, in a case where designated processing could not be executed, an error indicating a failure is returned as a response.

Figure 10:
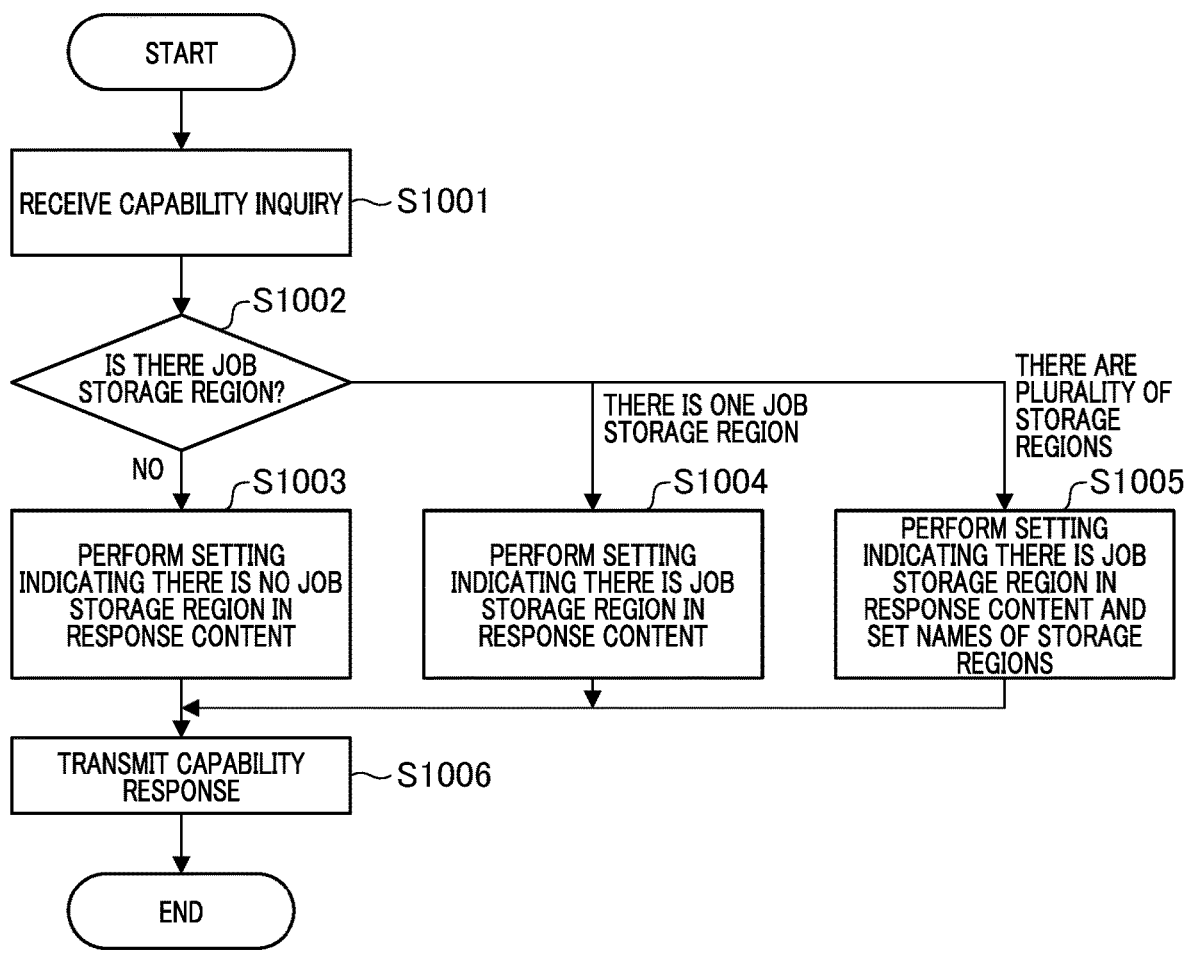
FIG. 10 is a flowchart showing a capability response processing of the printing device.

Next, details of processes of S503 and S504 in which the printing device 101 responds to an inquiry about a capability will be described with reference to FIG. 10. FIG. 10 is a flowchart illustrating capability response processing of the printing device 101. Processes shown in FIG. 10 and executed by the printing device 101 are realized by causing the CPU 201 to read a program stored in the ROM 202 to the RAM 203 and execute the program.

The present processing is started when the printing device 101 receives an inquiry about a printing capability transmitted by the client terminal 102 in S502. In S1001, the response unit 301 receives a capability inquiry request from the client terminal 102. Next, in S1002 to S1005, the response unit 301 determines a job storage function of the printing device 101 to determine a response content. First, in S1002, the response unit 301 determines whether or not there is a region for storing a job, and when there is a storage region, the response unit 301 determines whether the number of storage regions is one or two or more. In a case where an application providing a job storage function to the printing device 101 is not installed or in a case where operation settings in which a job storage function is not used by an administrator or the like are performed, it is determined that there is no job storage region, and the processing proceeds to step S1003. In a case where an application providing a job storage function to the printing device 101 is installed and in a case where there is only a single job storage region in which operation settings in which a job storage function is used by an administrator or the like are performed, it is determined that there is one job storage region, and the processing proceeds to S1004. In a case where an application providing a job storage function to the printing device 101 is installed, operation settings in which a job storage function is used are performed, and a job storage region is divided into a plurality of regions and managed, it is determined that there are a plurality of job storage regions, and the processing proceeds to S1005.

In a case where there is no job storage region, the response unit 301 stores information indicating that there is no job storage function and no job storage region in a response content in S1003. Specifically, as illustrated in FIG. 7D, "Hold-Job" is not included in Operations-supported, and a "Job-Storage" attribute is not also stored. It is indicated that there is no job storage function by not including "Hold-Job" in Operations-supported and that there is no job storage region by not including attribute information of "Job-Storage" in a response.

In a case where there is a single job storage region, the response unit 301 stores information indicating that there is a job storage function in the response content and that there is no more than one job storage region in S1004. Specifically, as illustrated in FIG. 7C, "Hold-Job" is included in Operations-supported, and a "Job-Storage" attribute is not stored. It is indicated that there is a job storage function by including "Hold-Job" in Operations-supported and that there is no more than one job storage region by not including attribute information of "Job-Storage" in a response.

In a case where there are a plurality of job storage regions, the response unit 301 stores information indicating that there is a job storage function in a response content and that there are a plurality of job storage functions and job storage regions in S1005. Specifically, "Hold-Job" is included in Operations-supported, and the number and name of a storage region is stored in "Job-storage-group" as illustrated in FIGS. 7A and 7B. It is indicated that there is a job storage function by including "Hold-Job" in Operations-supported and that there are a plurality of job storage regions by including the number and name of a storage region in attribute information of "Job-Storage".

Then, in S1006, the printing device 101 transmits the capability response packet created in S1003 to S1005 to the client terminal 102. Note that, in a case where the job storage region of the printing device 101 includes a region that can be disclosed and a region that cannot be disclosed, only a storage region that can be disclosed may be returned in a capability response. In addition, storage region information to be returned as a response in accordance with user information may be changed. For example, a user is specified and authenticated in accordance with user information such as Requesting-user-name included in a capability inquiry and results of user authentication of HTTP authentication such as digest authentication, and only a storage region that can be accessed by the user is returned as a response.

Figure 11:
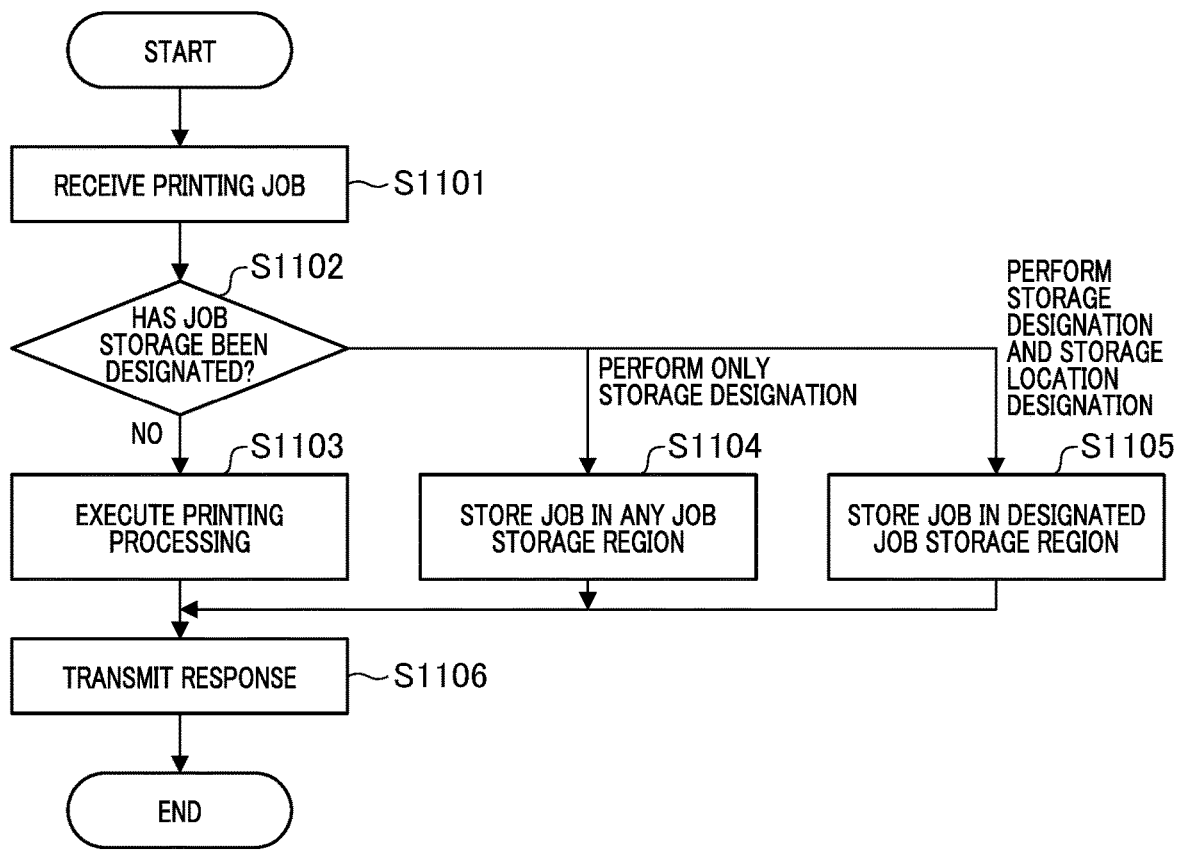
FIG. 11 is a flowchart showing job storage processing of the printing device.

Next, details of S508 and S509 when the printing device 101 has received a printing job will be described with reference to FIG. 11. FIG. 11 is a flowchart illustrating processing corresponding to a printing job request of the printing device 101. The processes shown in FIG. 10 and executed by the printing device 101 are realized by causing the CPU 201 to read a program stored in the ROM 202 to the RAM 203 and execute the program.

The present processing is started when the printing device 101 receives a printing request transmitted by the client terminal 102 in S507. In S1101, the job management unit 302 receives the printing request from the client terminal 102.

In S1102 to S1105, the job management unit 302 determines a processing content in accordance with the content of a printing job included in the printing request. First, in S1102, the job management unit 302 confirms the content of the printing job. Specifically, the content of "Operation" in the printing request packet is confirmed to confirm the processing content designated in the printing job. Further, in a case where the designated processing is printing job storage processing, it is confirmed whether a storage destination has been designated. In a case where the processing content designated in the printing job is not "Hold-Job", it is determined that it is not printing job storage processing, and the processing proceeds to S1103. In a case where the processing content designated in the printing job is not "Hold-Job", processing other than "Hold-Job", such as "Print-Job", "Create-Job", or "Send-document", may be designated in "Operation". In a case where the processing content designated in the printing job is "Hold-Job" and there is no attribute of "Job-storage-group", it is determined that the printing job storage processing has been designated, but a storage region has not been designated, and the processing proceeds to S1104. In a case where the processing content designated in the printing job is "Hold-Job" and there is an attribute of "Job-storage-group", it is determined that the printing job storage processing has been designated and a storage destination has been designated, and the processing proceeds to S1105.

In S1103, the printing device 101 executes the processing designated in the printing job without storing the received printing job in the storage. For example, in a case where the designated processing is printing processing, the printing execution unit 304 executes the printing processing and completes paper ejection.

In S1104, the job storage unit 3020 stores the received printing job in any storage. In a case where there are a plurality of storage regions, a printing job may be stored in a storage region No. 1, or in a case where settings for storing a printing job when a storage region is not designated are performed in advance, a printing job may be stored in a storage region designated by default in accordance with the settings. In addition, for a printing job request for which a storage region is not designated, a printing job is not stored in S1104, and an error may be returned as a response to the client terminal 102 in S1106 to notify the user that a printing job could not be stored.

In S1105, the job storage unit 3020 stores the received printing job in the designated storage region. For example, in the example of FIG. 9B, a storage region of "No. 3" is designated, and thus the job storage unit 3020 stores the received printing job in No. 3.

In S1106, the job management unit 302 responds to the client terminal 102 with the result of the processing executed in response to the printing request received from the client terminal 102. For example, in a case where the printing processing has been performed in S1104, the completion of the printing processing is notified of. In a case where a job has been successfully stored in S1104 and S1105, a response indicating that the job has been successfully stored is transmitted to the client terminal 102. FIG. 9D illustrates an example of a processing response packet returned as a response in a case where the job has been successfully stored. "Successful" indicating a success is stored in a status code. Further, in a case where the designated processing could not be executed, an error indicating a failure is returned as a response.

Note that, in a case where a default storage region for storing a printing job is set in advance in the printing device 101, "default" may be included in "Job-storage-group" of a capability response, and "default" may be able to be designated on the printing setting screen. The printing device 101 that has received a printing request in which a default has been designated as a storage destination stores a printing job in the storage region that has been designated as a default in advance. In addition, a name at the time of including "default" in "Job-storage-group" may be a name indicating that a value included in "Job-storage-group" is set to be a job storage destination, such as "this will be a BOX storage destination".

By mapping information of the storage region to the attribute information of "Job-storage-group" of the IPP in this manner, the client terminal can be notified of storage region information. Thereby, the user can also designate a storage region and give an instruction for storing a printing job even when the IPP is used, and the user can obtain the same effects as those of a vendor driver even when the user uses the IPP.

Second Embodiment

In the first embodiment, information on a printing job storage region has been transmitted and received using the attribute information of "Job-Storage" specified by the IPP. In a second embodiment, a mechanism for designating a printing job storage region by using an IPP vendor extension will be described. A vendor extension is not specified in the IPP standard, but is means for providing a mechanism for defining attributes in the same manner as that of the IPP standard and analyzing the attributes on a transmission side and a reception side in advance, and expressing any attribute value. In the present embodiment, a storage region that can be designated as a printing job storage destination in a capability response is notified of by using a vendor extension (vendor proprietary attributes). Note that a hardware configuration and a processing flow of each device in the second embodiment are the same as those in the first embodiment. Hereinafter, differences from the first embodiment will be described.

FIG. 12A illustrates an example of a capability response packet in which a printing device 101 responds to a capability request received from a client terminal 102 in the second embodiment. A storage region is notified of by using a vendor extension without using a "Job-Storage" attribute specified by the IPP. Here, the storage region is stored in attribute information indicating a storage region for storing a printing job defined independently by a vendor called "cn-job-storage-destination-supported". Information indicating a storage region for a printing job managed by the printing device 101 is stored in the value of attribute information indicating the storage region. The example of FIG. 12A corresponds to FIG. 4A, and numbers of "No. 1" to "No. 5" indicating storage regions 1 to 5 are stored. In a case where storage regions are managed by names as illustrated in FIG. 4C, the name of a storage region is stored in "cn-job-storage-destination".

The client terminal 102 that has received a capability response analyzes the vendor extension and displays a printing setting screen corresponding to the capability response. A specific mechanism for performing settings by analyzing the vendor extension of the IPP will be described. The vendor extension described in FIGS. 12A and 12B is a mechanism for defining attributes that are not specified in the IPP standard and performing any printing settings. By incorporating a module in which independent attributes are analyzed on both a transmission side (print client side) and a reception side (printer side), it is possible to realize vendor-specific extension printing settings that are not defined in a general standard print framework.

A mechanism for performing extension printing setting by an IPP print client will be specifically described. For example, a PSA for supporting vendor-specific printing settings can be associated with a standard printing program (hereafter, also referred to as an OS standard print driver) such as the IPP for performing IPP printing which is pre-installed in Windows 11. The PSA stands for Print Support Application. A printer vendor that develops the printing device 101 provides a PSA corresponding to MFP101 to an operating system (OS) vendor. The OS vendor uploads the PSA, which is a universal windows platform (UWP) application provided by the printer vendor, to an update server. An OS (Windows 11) installed on the client terminal 102 acquires a PSA from the update server in a case where a user operation using MFP101 has been received using a standard IPP client. Subsequently, the OS of the client terminal installs the PSA in the client terminal and associates the PSA with the standard IPP client. The associated PSA provides a printing setting screen for performing vendor-specific settings based on attributes of a vendor extension. In addition, the PSA provides a function of changing settings of a printing job of the IPP in accordance with circumstances of the vendor based on the settings made through the printing setting screen.

Figure 13B:
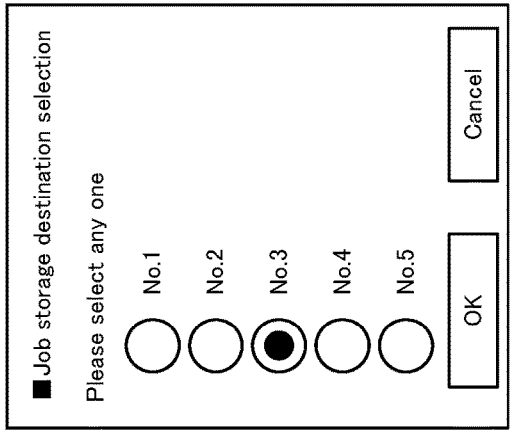
FIGS. 13A to 13C are diagrams illustrating examples of a printing setting screen in the second embodiment.
Figure 13C:
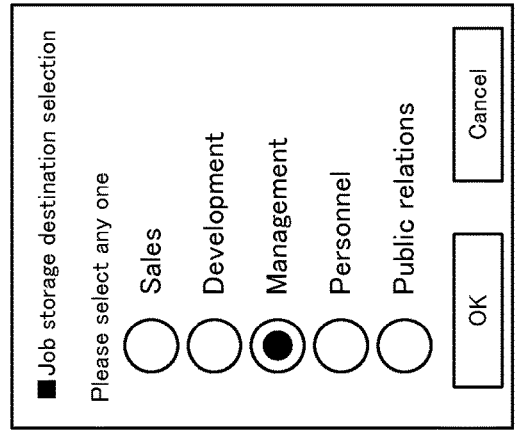
Figure 13A:
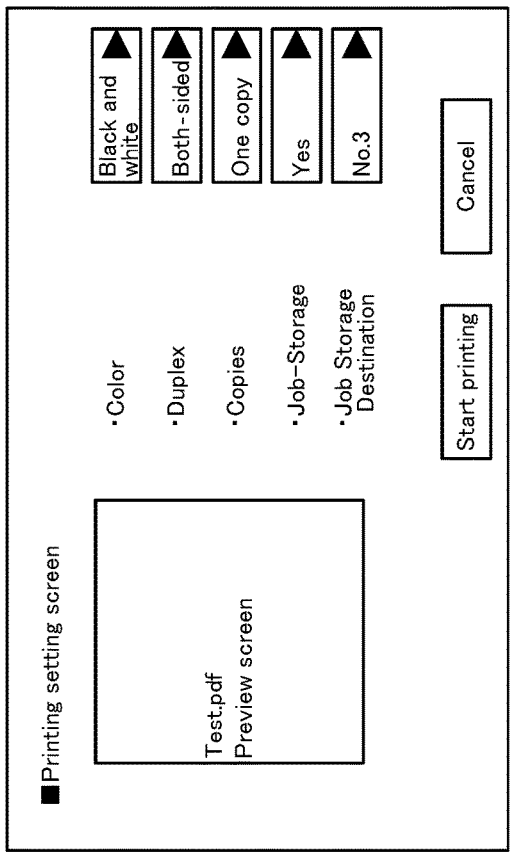

The PSA of the client terminal 102 that has received the response analyzes the vendor extension included in the capability response packet received by the client terminal 102 and displays a detailed setting screen illustrated in FIG. 11. Capability information based on the capability response packet is notified of to the PSA via the OS. FIGS. 13A to 13C are diagrams illustrating examples of printing setting screens displayed by the PSA in the second embodiment. The printing setting screens are displayed when an operation key (not illustrated) for performing detailed printing settings is pressed after the printing device 101 is selected as a printer to be used for output. When the OS detects that the operation key for performing detailed printing has been pressed, it is determined whether or not the PSA associated with the printer used for output has been installed. In a case where the PSA associated with the printer used for output has been installed, the PSA associated with the printer used for output is started up.

The PSA started up by the OS displays the printing setting screen including a display item for setting a candidate for a printing job storage destination. Specifically, the PSA displays, on the printing setting screen, "Job-Storage" for setting whether or not to store a printing job in the printing device 101 and "Job storage destination" for selecting a storage region in a case where the printing job is stored. In an option of "job storage destination", a storage region corresponding to information stored in "cn-job-storage-destination" of the capability response packet is displayed as a candidate for a storage destination that can be designated. For example, FIG. 13B illustrates an example of options of a job storage destination corresponding to the capability response packet illustrated in FIG. 12A. FIG. 13C illustrates an example of options of a job storage destination in a case where storage regions are managed by names in the printing device 101 as illustrated in FIG. 4C. In this manner, by giving a notification of attribute information defined by the vendor by extending the IPP, notifying the PSA being an extension plug-in, and enabling the PSA to perform printing settings, the client terminal can be notified of any display character string corresponding to the storage region and display the display character. That is, the PSA functions as a support program corresponding to a printer used as an output destination by the client terminal 102.

When the user designates the storage region of "No. 3" as a printing job storage destination on the printing setting screens illustrated in FIGS. 13A and 13B, the printing request packet illustrated in FIG. 12B is transmitted from the client terminal 102 to the printing device 101. This will be described in more detail. When the PSA detects that a printing start key has been selected, the PSA changes printing settings to be applied to a printing job of the IPP managed by an OS standard printing driver in accordance with circumstances of a vendor. For example, when the printing start key is pressed after "No. 3" is selected from among the options illustrated in FIG. 13B, information such as "cn-job-storage-destination: "No3"" is added to the printing setting managed by the OS standard printing driver. After the PSA changes the current printing settings, the OS standard printing driver generates a printing job with the changed printing settings and transmits the printing job to the printing device 101. FIG. 12B illustrates an example of a packet of a printing job transmitted after printing setting is appropriately changed. In the packet, "cn-job-storage-destination: "No3"" is stored as attribute information for designating a storage region for storing a printing job which is defined independently by a vendor, which is added by the PSA, by extending the IPP.

As described above, according to the present embodiment, even when the IPP is used, the client terminal is notified of storage region information by mapping information of a storage region to independent attribute information provided by the extension of the vendor. With the notification, the PSA, being a support program corresponding to the printing device 101, which has been installed in the client terminal can be notified of the attribute information. Thereby, even when the IPP is used, the user can designate a storage region and give an instruction for storing a printing job through the PSA being a support program. That is, even when a standard printing framework such as the IPP is used, the same effects as those of a vendor driver can be obtained by utilizing the PSA being a support program.

Note that the PSA may not be associated with the client terminal, or printing may be performed in a client terminal in which an OS that cannot be associated with a support program such as a PSA has been installed. In this case, a printing driver or a printing program of an OS standard IPP displays a printing setting screen. In this case, the printing driver or the printing program of the IPP skips attribute information which is not supported by itself, and generates a printing setting screen based on attribute information which is supported by itself. That is, a printing setting screen in which an item of Job-Storage-group and options are excluded from FIGS. 8A to 8C illustrated in the first embodiment is displayed.

As described above, in the second embodiment, a printing setting screen in which a storage region can be designated similar to a vendor driver can be provided to a user who has installed a support program. (Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-200439, filed Dec. 9, 2021, which is hereby incorporated by reference wherein in its entirety.

What is claimed is:

1. A printing system comprising:
an information processing device; and
a printing device including one or more storage regions for storing printing jobs received from the information processing device, the information processing device and the printing device communicating with each other using an Internet printing protocol (IPP),
wherein the information processing device includes
a memory storing instructions, and
a processor executing the instructions causing the information processing device to:
inquire the printing device about printing capability using IPP;
display a candidate for a storage destination of a printing job corresponding to information indicating a storage region acquired from the printing device on a printing setting screen in a case where the information indicating the storage region of the printing job is included in a response to the inquiry of the printing capability received from the printing device; and
designate a storage region corresponding to a storage destination of a printing job selected by a user on the printing setting screen and transmit a storage request for the printing job to the printing device,
wherein the printing device includes
a memory storing instructions, and
a processor executing the instructions causing the printing device to:
return, using IPP, a response to the inquiry of the printing capability, which is received from the information processing device, to the information processing device,
wherein in a case where there is no storage region of the printing job, the processor of the printing device returns the response without including Hold-Job in Operations-supported of the response and without storing the Job-Storage attribute,
in a case where there is a single storage region of the printing job, the processor of the printing device returns the response with including Hold-Job in Operations-supported of the response and without storing the Job-Storage attribute, and
in a case where there are a plurality of storage regions of the printing job, the processor of the printing device returns the response with including Hold-Job in Operations-supported of the response and with storing the Job-Storage attribute; and
store the printing job in a designated storage region in a case where the storage request for the printing job including information for designating the storage region of the printing job has been received from the information processing device.

2. The printing system according to claim 1, wherein the processor of the printing device returns the response with the information indicating the storage region included in attribute information defined in the IPP.

3. The printing system according to claim 2, wherein the attribute information is Job-Storage-group-supported.

4. The printing system according to claim 1, wherein information for designating the storage region of the printing job is specified in an attribute of Job-Storage-group.

5. The printing system according to claim 1, wherein the processor of the printing device returns the response with the information indicating the storage region included in attribute information defined independently by a vendor by extending the IPP, and the processor of the information processing device transmits information for designating the storage region of the printing job, which is included in attribute information defined independently by the vendor by extending the IPP.

6. The printing system according to claim 1, wherein the processor of the printing device determines information indicating the storage region returned as a response to the information processing device in accordance with user information included in the inquiry of the printing capability received from the information processing device.

7. The printing system according to claim 1, wherein the processor of the printing device does not store the printing job in a case where information for designating the storage region is not included in the storage request.

8. The printing system according to claim 1, the processor further causing the information processing device to display a setting screen including a print setting item for changing a print setting and a storage region setting item for setting the storage region of the printing job.

9. The printing system according to claim 1,
wherein the processor of the printing device determines a job storage function,
in a case where there is no storage region of the printing job, the processor of the printing device returns the response by including information in the response indicating that there is no storage region of the printing job,
in a case where there is a single storage region of the printing job, the processor of the printing device returns the response by including information in the response indicating that there is the job storage function and there is no more than one storage region of the printing job, and
in a case where there are a plurality of storage regions of the printing job, the processor of the printing device returns the response by including information in the response indicating that there is the job storage function and there are a plurality of storage regions of the printing job.

10. The printing system according to claim 1, wherein the processor of the printing device returns the response that includes only information about a storage region that can be disclosed in the printing capability.

11. The printing system according to claim 1, wherein the processor of the printing device authenticates based on user information contained in the inquiry of the printing capability and returns the response with information indicating a storage region of the printing job that can be accessed by the user.

12. A control method for a printing system including an information processing device and a printing device including one or more storage regions for storing printing jobs received from the information processing device, the information processing device and the printing device communicating with each other using an Internet printing protocol (IPP), the control method comprising:

inquiring, in the information processing device, the printing device about printing capability using IPP;
returning, using IPP, a response, in the printing device, to the inquiry of the printing capability, which is received from the information processing device, to the information processing device,
wherein in a case where there is no storage region of the printing job, the processor of the printing device returns the response without including Hold-Job in Operations-supported of the response and without storing the Job-Storage attribute,
in a case where there is a single storage region of the printing job, the processor of the printing device returns the response with including Hold-Job in Operations-supported of the response and without storing the Job-Storage attribute, and
in a case where there are a plurality of storage regions of the printing job, the processor of the printing device returns the response with including Hold-Job in Operations-supported of the response and with storing the Job-Storage attribute; and
displaying, in the information processing device, a candidate for a storage destination of a printing job corresponding to information indicating a storage region acquired from the printing device on a printing setting screen in a case where the information indicating the storage region of the printing job is included in a response to the inquiry of the printing capability received from the printing device;
designating, in the information processing device, a storage region corresponding to a storage destination of a printing job selected by a user on the printing setting screen and transmitting a storage request for the printing job to the printing device; and
storing, in the printing device, the printing job in a designated storage region in a case where the storage request for the printing job including information for designating the storage region of the printing job has been received from the information processing device.

* * * * *